G. H. POUNDER.
SECTIONAL DRAW BAR FOR HARROWS.
APPLICATION FILED JAN. 2, 1914.
1,144,503.
Patented June 29, 1915.
2 SHEETS—SHEET 2.
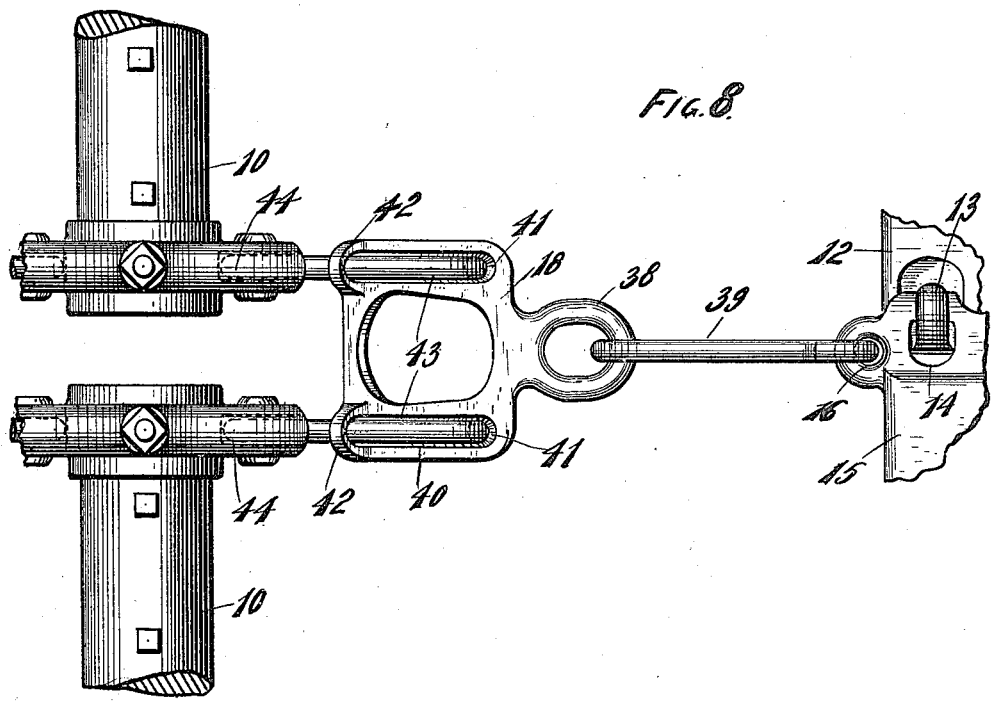
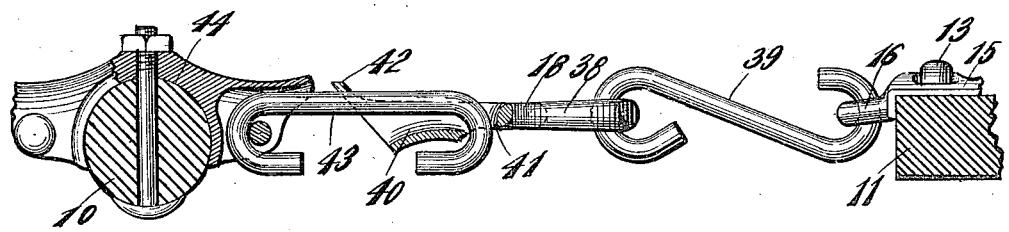
WITNESSES.
INVENTOR
George H Pounder
By Morsell & Caldwell
ATTORNEYS

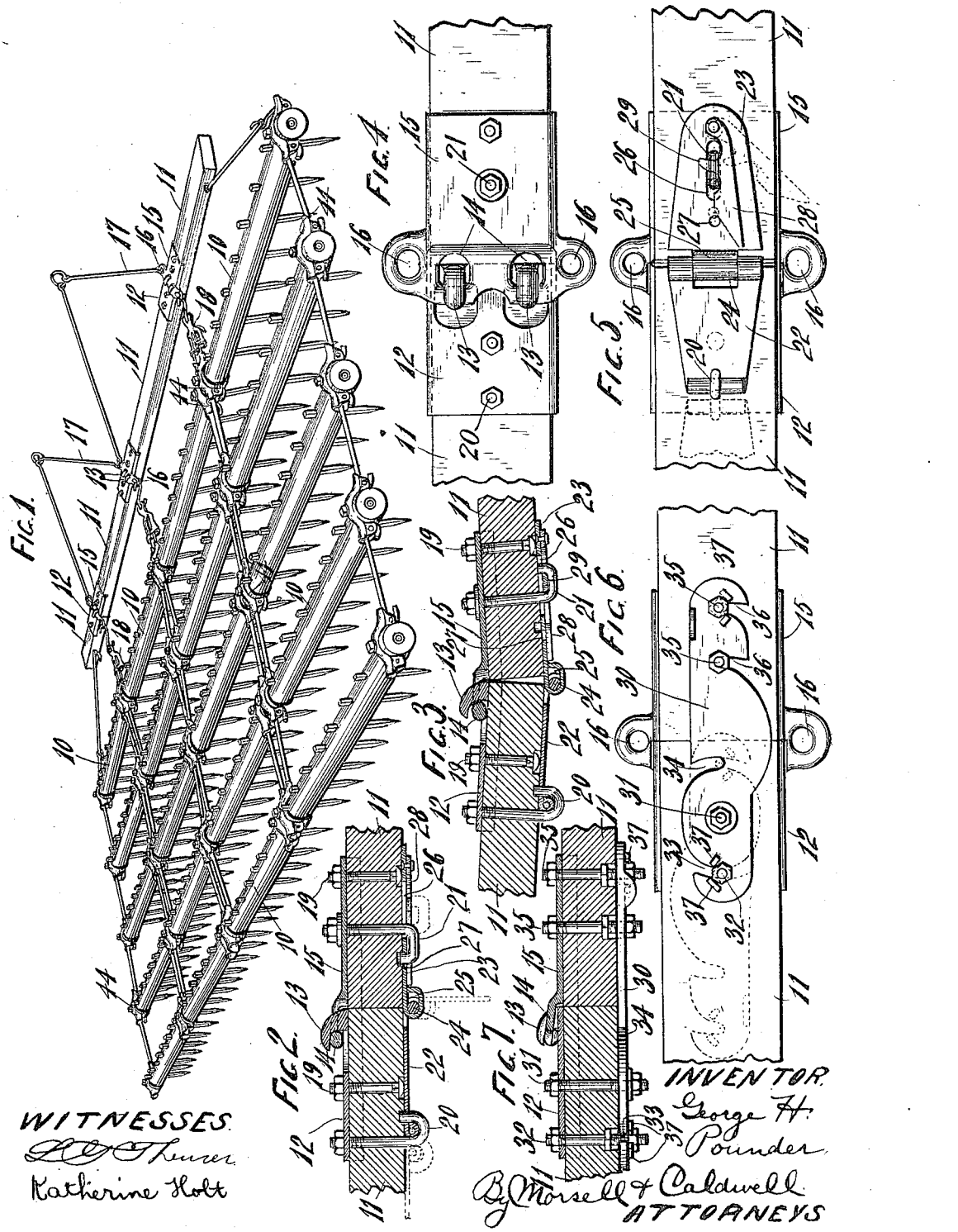

UNITED STATES PATENT OFFICE.

GEORGE H. POUNDER, OF FORT ATKINSON, WISCONSIN.

SECTIONAL DRAW-BAR FOR HARROWS.

1,144,503. Specification of Letters Patent. Patented June 29, 1915.

Application filed January 2, 1914. Serial No. 809,900.

*To all whom it may concern:*

Be it known that I, GEORGE H. POUNDER, a citizen of the United States, and resident of Fort Atkinson, county of Jefferson, and State of Wisconsin, have invented new and useful Improvements in Sectional Draw-Bars for Harrows, of which the following is a description, reference being had to the accompanying drawings, which are a part of this specification.

This invention has for its object to provide draw irons of novel construction for connecting the sections of a harrow with the draw bar so as to avoid the crowding of the harrow sections by side draft of the end draw irons and to relieve the draw bars of the shock or jerk felt by one section of the harrow passing over an obstruction.

With the above and other objects in view the invention consists in the sectional draw bars for harrows as herein claimed and all equivalents.

Referring to the accompanying drawing in which like characters of reference indicate the same parts in the different views, Figure 1 is a perspective view of a harrow provided with a sectional draw bar; Fig. 2 is a longitudinal sectional view through the abutting ends of draw bar sections thereof showing a preferred form of coupling means in position for holding the draw bar sections in rigid relation to each other; Fig. 3 is a similar view thereof with the parts in position for allowing a limited vertical flexibility at the draw bar section couplings; Fig. 4 is a plan view showing the top members of such coupling means; Fig. 5 is a bottom view showing the bottom members thereof in the condition for giving flexibility to the draw bar sections as shown in Fig. 3; Fig. 6 is a similar view showing a modified form of the bottom connector; and, Fig. 7 is a longitudinal sectional view thereof; Fig. 8 is a plan view showing the draw iron for connecting the harrow sections with the draw bars; Fig. 9 is a sectional side view thereof.

In these drawings 10 indicates a series of harrow sections connected together in the usual manner to constitute a sectional harrow, the draw bar, to which the harrow sections are attached, being formed in sections 11, all of which, except the two end sections, are of the same length as the harrow section, and the end sections for convenience being made somewhat shorter. The draw bar sections are connected together by couplings which will be now described. A plate 12 bolted on top of one end of a draw bar section with side flanges fitting against the sides of the draw bar section has a pair of hooks 13 at its end, which is also at the end of the draw bar section, said hooks extending upwardly and away from the end of the draw bar section and adapted to engage a pair of eyes 14 formed in the overhanging edge of a similar plate 15 bolted on top of the end of the adjoining draw bar section. The overhanging edge of plate 15 continues to the front and rear of the draw bar to form eyes 16 in which the bail rods 17 and the draw irons 18 respectively engage.

Of the bolts which fasten the plates 12 and 15 in place there is one bolt 19 for each plate which is countersunk on the bottom of the draw bar section and another bolt for each plate which forms a hook with its end let into a recess on the bottom of the draw bar section, the hook bolt for plate 12 being designated by the numeral 20 and the hook bolt for plate 15 being designated by the numeral 21. The hook bolt 20 clamps a hinge plate 22 to the bottom of the draw bar section and its companion hinge plate 23 has a pivotal connection therewith with longitudinal play permitted by the pivot pin 24 of pivot plate 22 riding in an elongated loop 25 of the hinge plate 23. The hook bolt 21 in entering its recess in the bottom of the draw bar section locks the pivot plate 23 in a position where it is drawn tightly against the pivot bolt 24 so as to permit no play in the joint of the two draw bar sections. This hook bolt passes through a slot 26 in the hinge plate 23 and in this rigid connection reaches beyond the slot and passes through an opening 27 in the hinge plate 23 in order to fit within its recess in the bottom of the draw bar section. When it is desired to allow for flexibility in the joint between the draw bar sections it is only necessary to loosen the hook bolt 21 and turn it a half turn so that its hook end lies within the slot 26 as well as its stem portion and as the hinge plate 23 would then be free to swing downwardly to the position shown in dotted lines in Fig. 2 a latch member 28, which is pivotally mounted on the hinge plate 23, is swung to the position shown in Fig. 5 where its projecting tongue 29 passes through the hook bend of hook bolt 21 and thus serves to lock the hinge plate 23 to the underside of the draw bar section. Now, the play of the pivot pin 24 within the elongated loop 25 allows a certain amount of flexibility in the joint between the draw bar sections, but this play is confined to vertical movement of the draw bar sections. To disconnect the draw bar sections it is only necessary to release the hinge plate 23 in the manner just described, that is by turning the hook bolt 21 to the position in which it lies wholly within the slot 26 and with the latch 28 in its open position, as shown by dotted lines in Fig. 5, so that the hinge plate 23 is free from connection with its draw bar section and then by swinging one draw bar section with relation to the other the hooks 13 may be withdrawn from the eyes 14. During shipment it is desirable to have the hinge plates 22 and 23 withdrawn from their normal position to a position where they will lie flat against the draw bar section to which the hinge plate 22 is connected and this is accomplished by loosening hook bolt 20 and giving it and the hinge plates a half turn thereon to the position shown in dotted lines in Fig. 5.

In the modified form of the invention shown in Figs. 6 and 7 the hinge plates are dispensed with and a single locking plate 30 is substituted therefor. The top plates 12 and 15 are retained, but their clamping bolts are all of a somewhat different construction, being threaded on both ends. The bolt 31 which is nearest the end of one draw bar section passes through a pivotal opening in the locking plate 30 and has a nut threaded on each end thereof, and the other bolt 32 on that end of the draw bar section carries a shoulder or a nut countersunk in the bottom of the draw bar section, besides having the nuts on its ends, and the locking plate has a pair of notches 33 and 34 to receive said bolt in either of the two positions in which the locking plate 30 may be placed by swinging it on the pivot bolt 31 and in either of these positions it may be locked by tightening the nut on the lower end of bolt 32. The two bolts 35 which clamp the plate 15 in place are likewise provided with shoulders or nuts countersunk in the bottom of the draw bar section, in addition to the nuts on their ends, and the rocking plate 30 has a pair of notches 36 to engage therewith when it is extended to its locking position as shown in full lines in Fig. 6. Slightly raised shoulders or lugs 37 are preferably formed at the edges of slots 33 and 36 to prevent accidental swinging of the locking plate which would disengage it from the bolts. With this form of connection no flexibility is provided for in the joint between the draw bar sections, but they are rigidly held together by the locking plate 30, though they may be readily disengaged by swinging the locking plate to the position shown in dotted lines in Fig. 6 and then disconnecting the hooks 13 from the eyes 14 as before mentioned.

By means of the construction of sectional draw bars of this invention they may be made in as many sections as there are harrow sections and the sections may be of the same length as the harrow sections for convenience in packing for shipment, though it is desirable to make the end sections somewhat shorter to reduce the weight. Notwithstanding the numerous sections of the draw bar, the form of the connection between them is such that the entire draw bar is made as rigid as if made in one piece with the capability of being made flexible to permit of vertical movement only of the draw bar sections when desired. It is obvious that a harrow of this construction may be enlarged or made smaller by adding or subtracting a section of the draw bar with its harrow section.

The draw irons 18 are shown in detail in Figs. 8 and 9 in the form of a casting providing a loop 38 at its front end engaged by a hook 39 which enters one of the eyes 16 of the draw bar connection. At each side the draw iron 18 has a depressed groove 40 leading from an opening 41 near a shoulder at the front end to a flaring guide arch 42 at the rear end and a double hook 43 passes beneath the arch 42 and lies within the groove 40 with one hooked end engaged through the opening 41, while its rear hooked end engages the end connection 44 of the front harrow section 10 of one gang of harrow sections. The hook member 43 is free to have a limited vertical swinging movement with relation to the draw iron so that the harrow sections may move independently of each other in passing over irregular surfaces, but the guide arches 42 prevent a lateral freedom of movement of the hook members. This construction avoids the crowding of harrow sections caused by side draft of the end draw irons and relieves the draw bar of the shock or jerk felt by one section of harrow passing over an obstruction by distributing the shock to the adjoining sections of the harrow which would not ordinarily be the case.

What I claim as new and desire to secure by Letters Patent is:

1. In a harrow, a draw iron having a loop for connection with the draw bar and provided with openings and guide arches, hook members engaging the openings and confined by the guide arches so as to permit freedom of vertical movement and prevent lateral movement thereof, said hook members being adapted for connection with the ends of different harrow sections.

2. In a harrow, a draw iron forming a loop for connection with the draw bar and having an opening at each side thereof with a depressed groove extending rearwardly to a guide arch, said groove and guide arch forming a flaring guide way, and hook members engaging the openings and lying within the flaring guide way to have a free vertical swinging movement without lateral play.

In testimony whereof, I affix my signature, in presence of two witnesses.

GEORGE H. POUNDER.

Witnesses:
GEO. ERNEST WARD,
LLOYD R. DONKLE.

Copies of this patent may be obtained for five cents each, by addressing the "Commissioner of Patents, Washington, D. C."